United States Patent
Cross et al.

[11] Patent Number: 5,249,337
[45] Date of Patent: Oct. 5, 1993

[54] RELEASABLE FILAMENT CLAMP

[76] Inventors: Andrew L. Cross, 17774 Ravenna Rd., Mantua, Ohio 44255; Thomas Luby, 186 N. Revere Rd., Akron, Ohio 44333

[21] Appl. No.: 895,273

[22] Filed: Jun. 8, 1992

[51] Int. Cl.5 ............................................. A44B 17/00
[52] U.S. Cl. ................................ 24/129 R; 24/115 G; 24/543
[58] Field of Search ............ 24/129 R, 129 A, 129 D, 24/129 W, 543, 130, 115 G, 115 H, 30.58

[56] References Cited

U.S. PATENT DOCUMENTS

| | | | |
|---|---|---|---|
| 887,520 | 5/1908 | Rehling | 24/129 R |
| 1,229,855 | 6/1917 | Alexander | 24/129 A |
| 3,289,260 | 12/1966 | Buscall, Jr. | 24/129 R |
| 4,643,389 | 2/1987 | Elson et al. | 24/543 |
| 4,649,664 | 3/1987 | Mahan | 24/130 |
| 4,901,402 | 2/1990 | Begemann | 24/129 D |
| 5,035,399 | 7/1991 | Rantanen-Lee | 251/10 |

FOREIGN PATENT DOCUMENTS 2016579  9/1979  United Kingdom ............ 24/129 R Primary Examiner—Victor N. Sakran
Attorney, Agent, or Firm—John F. McDevitt

[57] ABSTRACT

A method and means are provided to releasably secure one or more filament lengths in place with a single piece molded polymer clamp device. Said clamp device employs frictional retention means which cooperate with openings to grip the filament or filaments.

11 Claims, 1 Drawing Sheet

RELEASABLE FILAMENT CLAMP

BACKGROUND OF THE INVENTION

This invention relates generally to a method and means for releasably clamping a length of filament in place and more particularly to clamping means enabling one or more filament lengths to be releasably secured thereto as well as thereafter released therefrom by a user in a more convenient manner.

A wide variety of clamp devices are already known which enable a user to releasably hold a free end of one or more filament lengths in place such as a rope, cord, cable and wire as well as thereafter disconnect these objects from such mechanical engagement when desired. For example, tent ropes, boat lines and even wire cables can all be temporarily secured in place for an eventual disconnection by the user with mechanical clamp means in many ways. The known clamp means frequently require the filament end or ends to be knotted or otherwise fitted with a coupling before proper engagement with the device. Other type clamp means enabling the free ends of a pair of filament lengths to be joined together require the operation of multi-part clamp devices in order to both engage and release the filaments during use. Such multi-part clamps commonly employ screws, bolts and other type threaded fastener components either for adjustment of the clamp when engaging or disconnecting the one or more filaments being held or to enable a tensioniong adjustment of the filaments while being held. From the foregoing it will be apparent that a more simple and effective clamp means remains desirable both with respect to construction of such device as well as its subsequent utilization.

It is one object of the present invention, therefore, to provide an improved clamp means for mechanical retention of one or more filament lengths.

It is another object of the present invention to provide a novel single-piece clamp having frictional retention means for at least one filament length.

A still further object of the present invention is to provide such clamp device with frictional retention means further exerting a restraining force against having the filament length being released therefrom.

Another object of the present invention is to provide a particular physical form of said novel single-piece clamp device having a plurality of frictional retention means preventing physical separation between the free ends of a pair of filaments releasably secured thereto.

It is still another object of the present invention to provide a novel method enabling a user to both connect and disconnect one or more filament lengths in a more convenient manner.

These and still further objects of the present invention will become apparent upon considering the following detailed description for the present invention.

SUMMARY OF THE INVENTION

Novel mechanical clamp means have now been discovered enabling the free end of one or more filament lengths to be secured in place as well as removed by a user employing simple frictional engagement. Generally, said improved clamp device comprises a single-piece hollow body member molded with organic polymer, integral retention means molded in said body member to include at least one pair of cooperating spaced-apart rib-like elements projecting inwardly from opposing inner wall portions to form an inscribed angle if further extended to intersect and which terminate in shoulder portions for retention of the filament therebetween by friction fit, and complementary opposed openings provided in said body member enabling passage of the filament therethrough which are aligned along an axis intersecting the inscribed angle formed with said retention means. Such entire device can be formed with either flexible thermoplastic polymer materials or rigid thermoset type polymer materials employing conventional injection or extrusion molding practices. In a preferred physical configuration, the body member is cylindrically shaped with a circular or elliptical cross section while having a single pair of said cooperating rib-like elements projecting inwardly from opposing walls of said cylinder body to grip the filament therebetween. In a different physical form, multiple pairs of the cooperating rib-like elements are provided oriented in opposite directions so that a free ends of the pair a of filament lengths can be joined together therebetween. In a still different physical embodiment, the body member can have a rectangular box-like shape with openings being provided at both ends and with one or more pair of rib-like elements being disposed intermediate said ends. The preferred rib means for all illustrated physical configurations of the device also project forwardly from the adjoining end or inner wall of the body member so as to exert a restraining force against release of the filament length being held.

DETAILED DESCRIPTION OF THE PREFERRED EMBODIMENTS

Figure 1:
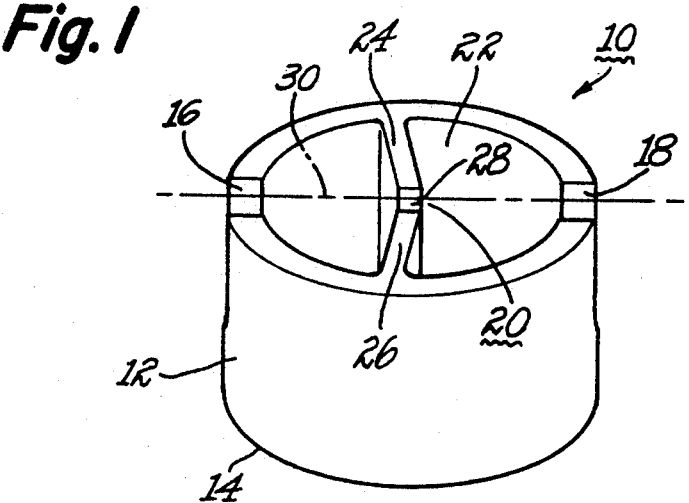
FIG. 1 is a perspective view depicting a representative clamp device of the present invention having a single retention means with which to mechanically secure the filament length.

Referring to the accompanying drawings, there is depicted in FIG. 1 a perspective view for a representative clamp device of the present invention enabling a user to secure the free end of a single filament length (not shown) in place as well as thereafter release the filament therefrom with a single action. More particularly, both engagement of the filament with the illustrated device and its release require only employment of the provided frictional retention means so as to obviate any need by said user to secure the filament in place with additional fastening means such as screws, bolts and the like. Accordingly, the depicted clamp device 10 comprises a single-piece hollow body member molded with organic polymer 12 having a cylindrical configuration 14 with opposed slot openings 16 and 18 being provided in the wall portions thereof. Frictional retention means 20 are integrally molded into the hollow central cavity 22 of said body member 10 to engage the filament length after insertion into the opposed slot openings 16 and 18. The depicted retention means employs a pair of spaced-apart rib-like elements 24 and 26 projecting inwardly from opposed inner walls of the cylindrical body member to form an inscribed angle within the hollow central cavity 22 if further extended to intersect each other. The inner ends of said rib-elements terminate in shoulder portions to grip the filament length therebetween by friction fit when engaged by a simple snap-action insertion of the device user. As can be seen in the present drawing, the opening 28 formed by said spaced-apart rib elements resides along a center axis 30 of the device with wall openings 16 and 18 also being aligned along the same axis for operative association therewith. The desired cooperative effort simple requires a user to insert the free end of the filament into wall opening 16 followed by securing the free end of the filament in place by its engagement with the provided frictional retention means. As can also be seen in the present drawing, having the rib-like elements project forwardly from the filament entry wall produces a restraining force against having the affixed filament being thereafter accidentally released therefrom until such release is carried out by the user. Ability to form the above described clamp device entirely by means of a single injection molding step affords still other significant advantages. Manufacturing costs can thereby be reduced since low-cost conventional polymer materials can be employed while parts assembly is avoided. It will also be apparent that modifications in the physical shape of the above described clamp device are contemplated which still operate in an comparable manner. Thus, shaping the hollow cylindrical body member to have an elliptical cross section while still retaining its major central axis in the same direction can provide a user with comparable performance.

Figure 2:
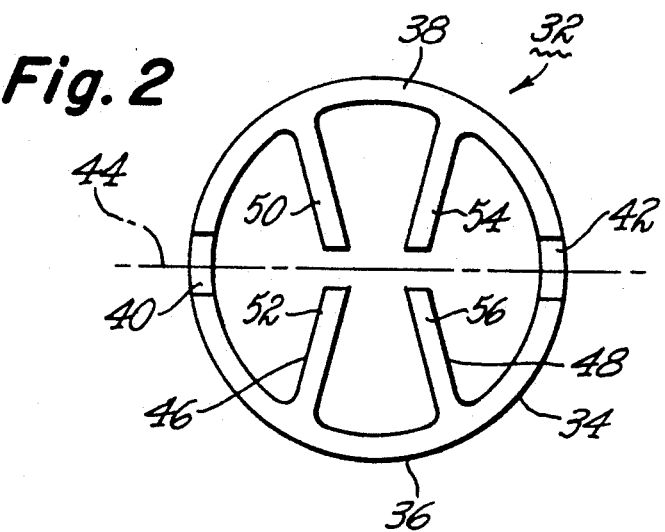
FIG. 2 is a top view for a similar clamp device provided with multiple retention means to mechanically secure a pair of filament lengths together.

FIG. 2 is a top view for a different molded clamp device of the present invention prior to having the free ends of a pair of filament lengths (not shown) being held together. The depicted clamp device 32 can be produced from a single molded extrusion (also not shown) with a cross section as illustrated upon severing individual body members from the extruded product in a customary manner. Accordingly, such individual clamp device 32 comprises a molded single-piece hollow body member 34 again formed with organic polymer as a cylinder having a circular cross section 36. Wall portions 38 of said hollow body member 34 include opposed slot openings 40 and 42 which are again aligned along a center axis 44 of the device. Also aligned along said center axis are cooperating pairs of frictional retention means 46 and 48 which engage the free ends of individual filament lengths inserted into the provided slot openings from opposite directions. First retention means 46 includes a pair of spaced-apart rib-like elements 50 and 52 projecting inwardly from wall portions 38 of the hollow body member so as to form an inscribed angle if extended to intersect at center axis 44 while also projecting forwardly from adjoining slot opening 40. In a similar orientation, second retention means 48 has a pair of spaced-apart rib-like elements 54 and 56 projecting forwardly from its adjoining slot opening 42. A cooperative effort can thereby take place between such oppositely disposed pair of retention means so that securing one filament length into first retention means 46 after passage through opening 40 enables it to be effectively held together with a second filament length inserted from the opposite direction into opening 42 for engagement by the remaining retention means 48. As can also be seen, having both retention means extend forwardly from adjoining inner wall portions of the hollow body member again enables each retention means to exert a restraining force against release of the individual filament lengths being held.

Figure 3:
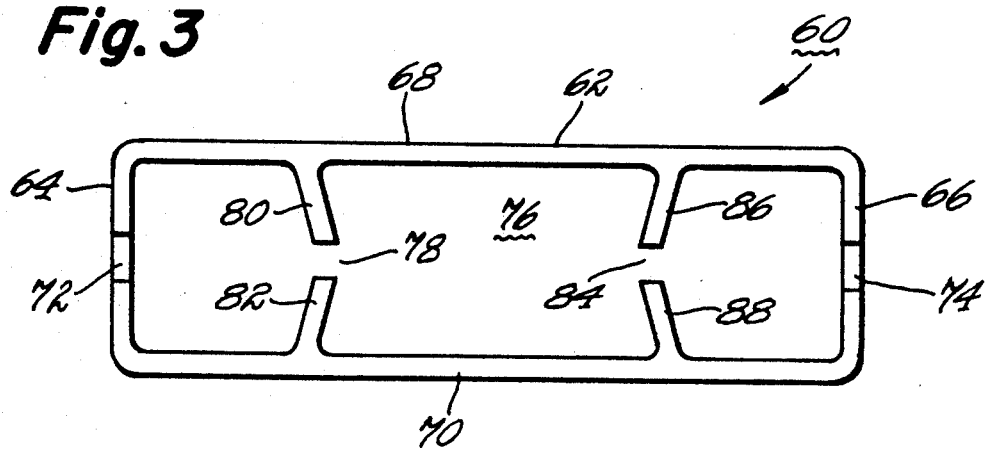
FIG. 3 is a top view depicting a still different body construction for the present clamp device provided with multiple retention means.

As hereinabove indicated, FIG. 3 is a top view for a differently shaped molded clamp device of the present invention having multiple frictional retention means cooperating in the same manner as described for the preceding embodiment. Accordingly, said clamp device 60 comprises a molded single-piece hollow body member 62 again formed with organic polymer to have a rectangular box-like configuration devoid of either top and bottom faces. Body member 62 includes front end face 64 opposite rear end face 66 being joined together by longer side faces 68 and 70. Said end faces each include slot openings 72 and 74 enabling individual filament lengths (not shown) to be inserted from opposite directions for frictional retention within the central cavity 76 of the device. Again, a first retention means 78 having spaced-apart rib-like elements 80 and 82 is provided for frictional engagement with the free end of a filament length inserted into opening 72 whereas second retention means 84 having spaced-apart rib-like elements 86 and 88 is provided for like engagement of a fiber length inserted into opening 74. While not expressly shown in the present drawing, it can also be appreciated that the provided retention means cooperate in resisting disengagement of both filaments being held.

It will be apparent from the foregoing description that a more convenient to use means have been provided to releasably secure one or more filament lengths in place. It will also be apparent that modifications can be made in the specific method and clamp means described for the illustrated embodiments without departing from the spirit and scope of the present invention. For example, modification of the frictional retention means provided in the illustrated clamp device are contemplated such as by having the rib-like element pairs aligned perpendicular to the inner wall portions of the molded hollow body member and/or providing other structural means exerting a spring-back action in such retention means to resist forces tending to disengage a frictionally held filament. Accordingly, it is intended to limit the present invention only by the scope of the appended claims.

What we claim as new and desire to secure as Letters Patent of the United States is:

1. A clamp device to releasably secure a length of filament in place which consists essentially of:
   (a) a single-piece hollow body member molded with organic polymer,
   (b) integral retention means molded in said body member to include at least one pair of cooperating spaced-apart rib elements projecting inwardly from opposing inner wall portions to form an inscribed angle if further extended to intersect and which terminate in shoulder portions for retention of the filament therebetween by frictional engagement,
   (c) complementary opposed slot openings provided in said body member enabling passage of the filament therethrough which are aligned along an axis intersecting the inscribed angle formed with said retention means, and
   (d) said integral retention means cooperating with said complementary opposed slot openings so that both engagement and release of the filament length takes place with a single snap-action.

2. The device of claim 1 wherein the body member is formed with a rigid polymer.

3. The device of claim 1 wherein the body member is formed with a flexible polymer.

4. The device of claim 1 wherein the body member is cylindrically shaped.

5. The device of claim 1 wherein the body member has an elliptical cross section.

6. The device of claim 1 wherein the body member comprises an open-ended container having a rectangular box-like configuration devoid of top and bottom faces but having a front end face and a rear end face joined together with longer side faces, said container having the retention means located intermediate the end faces with the opposed slot openings being provided in said end faces.

7. The device of claim 1 which further includes multiple pairs of cooperating rib elements which are oriented in opposite directions.

8. A clamp device to secure a length of filament in place which consists essentially of:
   (a) a single-piece hollow body member molded with organic polymer in the form of a cylinder having a circular cross section,
   (b) integral retention means molded in said cylinder comprising a single pair of cooperating space-apart rib elements projecting inwardly from opposing inner walls of said cylinder to form an inscribed angle if further extended to intersect and which terminate in shoulder portions for retention of the filament therebetween by frictional engagement,
   (c) complementary opposed slots provided in said cylinder walls enabling passage of the filament therethrough which are aligned along an axis intersecting the inscribed angle formed with said pair or rib elements, and
   (d) said integral retention means cooperating with said complementary opposed slots so that both engagement and release of the filament length takes place with a single snap-action.

9. A clamp device to connect the free ends of a pair of filament lengths together which consists essentially of:
   (a) a single-piece hollow body member molded with organic polymer in the form of a cylinder having a circular cross section,
   (b) integral retention means molded in said cylinder comprising two pair of cooperating spaced-apart rib elements projecting inwardly from opposing inner walls of said cylinder to form inscribed angles aligned in opposite directions along a common axis if further extended to intersect and which each terminate in shoulder portions for retention of an individual filament therebetween by frictional engagement,
   (c) complementary opposed slots provided in said cylinder walls enabling passage of an individual filament therethrough which are also aligned along said common axis, and
   (d) said integral retention means cooperating with said complementary opposed slots so that both engagement and release of each filament length takes place with a single snap-action.

10. A method to releasably secure a length filament in place which consists essentially of:
    (a) inserting the free end of the filament into openings provided with a clamp device having a single-piece hollow body member molded with organic polymer, integral retention means molded in said body member to include at least one pair of cooperating spaced-apart rib elements projection inwardly from opposing inner wall portions to form an inscribed angle if further extended to intersect and which terminate in shoulder portions for retention of the filament therebetween by frictional engagement, and complementary opposed slot openings provided in said body member enabling passage of the filament therethrough which are aligned along an axis intersecting the inscribed angle formed with said retention means,
    (b) securing the free end of the filament in place by snap-action engagement with the provided retention means, and
    (c) releasing the filament length from said retention means with further snap-action.

11. A method to releasably connect the free ends of a pair of filament lengths together which consists essentially of:
    (a) aligning the free ends of the individual filament lengths so as to meet along a common axis,
    (b) inserting the free end of each filament into one opening provided with a clamp device having a single-piece hollow body member molded with organic polymer, integral retention means molded in said body member to include two pair of cooperating spaced-apart rib elements projecting inwardly from opposing inner wall portions to form inscribed angles aligned in opposite directions along said common axis if further extended to intersect and which each terminate in shoulder portions for retention of an individual filament therebetween by frictional engagement, and complementary opposed slot openings provided in said body member enabling passage of an individual filament therethrough which are also aligned along said common axis,
    (c) securing the filament lengths together by engaging the free end of each filament with an individual pair of cooperating rib elements next adjacent to a complementary opening employing snap-action, and
    (d) releasing each filament length from engagement with the retention means employing further snap-action.

* * * * *